Figure 3:
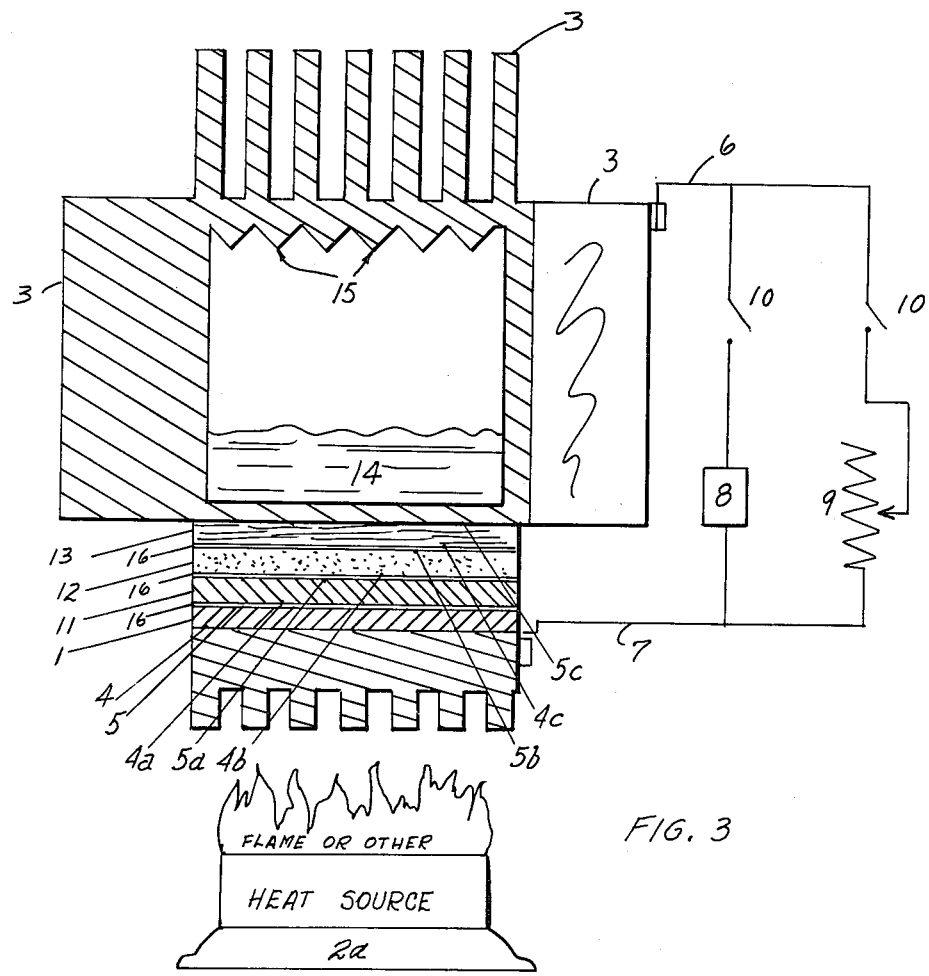

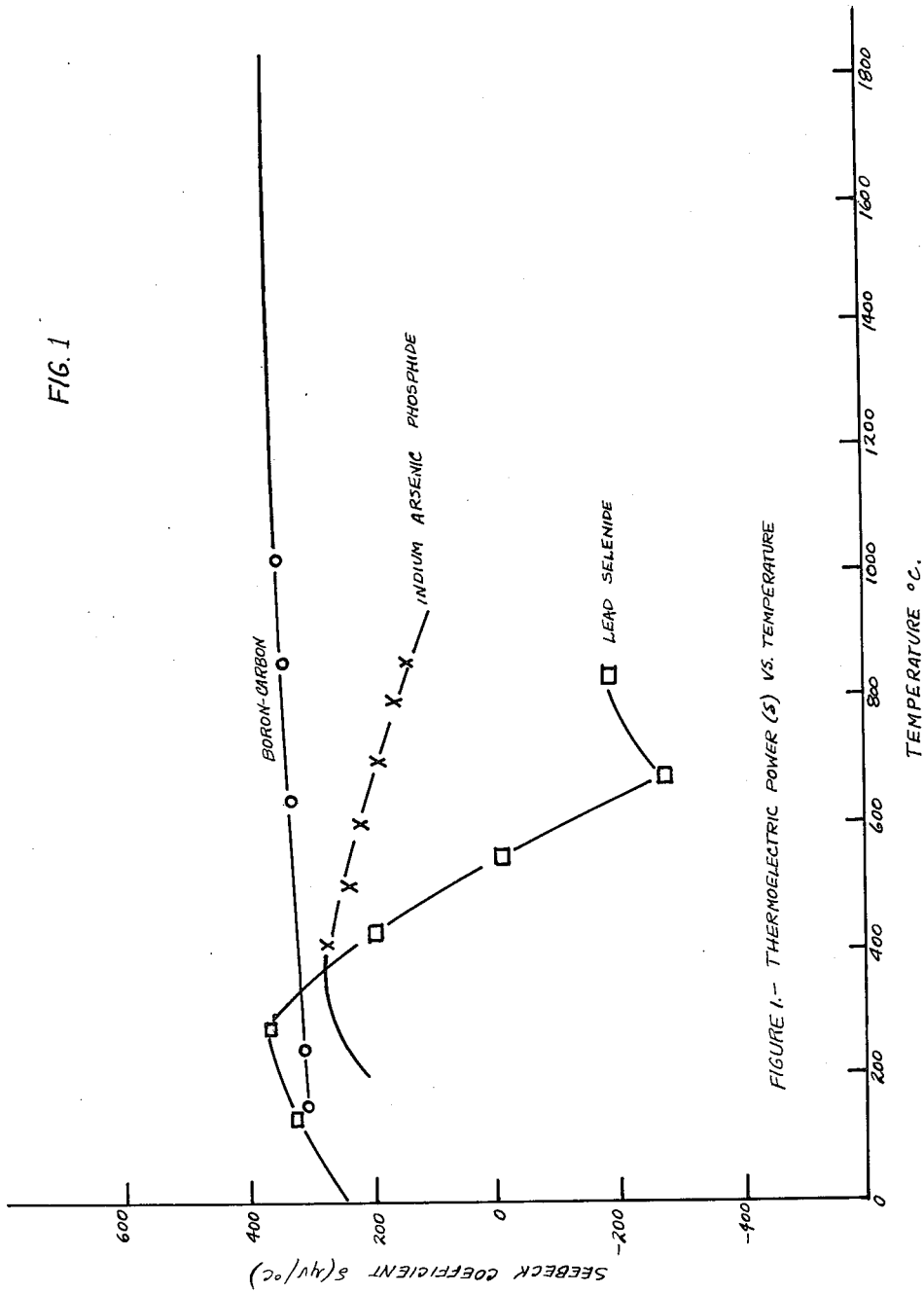

April 23, 1963 C. M. HENDERSON ETAL 3,087,002
THERMOELECTRICITY
Filed July 1, 1959 10 Sheets-Sheet 2

INVENTORS
Courtland M. Henderson
and
BY Darrel M. Harris

Herman O. Bauermeister
Attorney

April 23, 1963    C. M. HENDERSON ETAL    3,087,002
THERMOELECTRICITY
Filed July 1, 1959    10 Sheets-Sheet 3
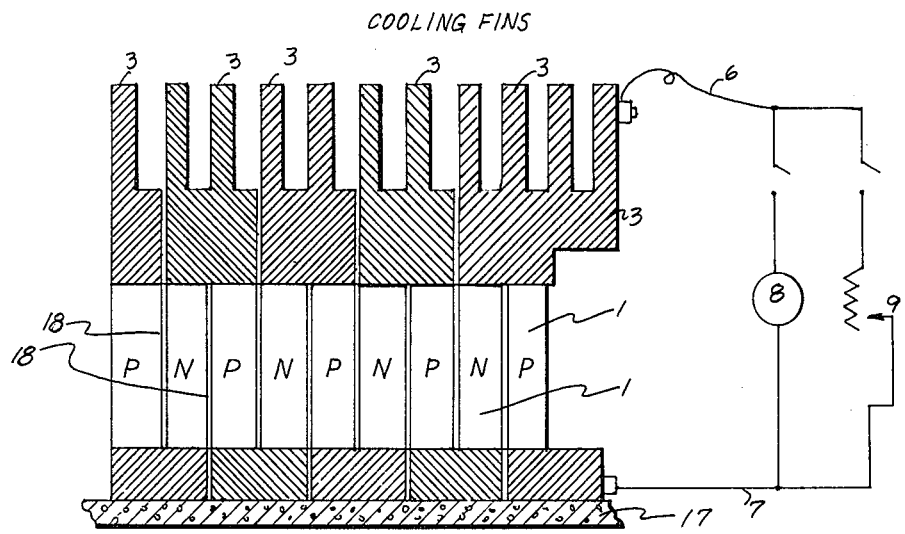
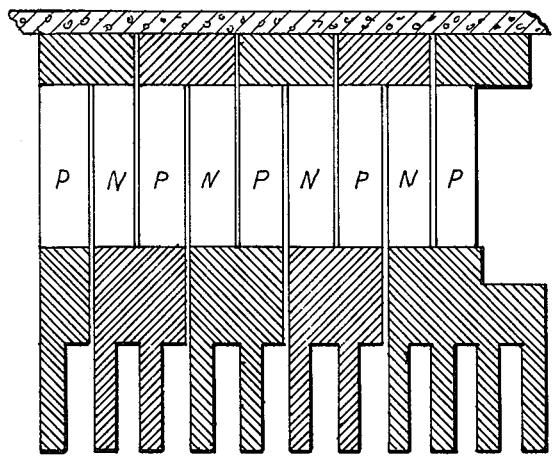
FIG. 4
INVENTORS
Courtland M. Henderson
and
Darrel M. Harris
BY
Herman O. Bauermeister
attorney April 23, 1963 C. M. HENDERSON ETAL 3,087,002
THERMOELECTRICITY
Filed July 1, 1959 10 Sheets-Sheet 4

FLOW OF HOT EXHAUST OR REACTOR MEDIA

INVENTORS
Courtland M. Henderson
and
BY Darrel M. Harris
Norman O. Bauermeister
Attorney

RESISTIVITY VS. TEMPERATURE FOR BORON MATERIALS

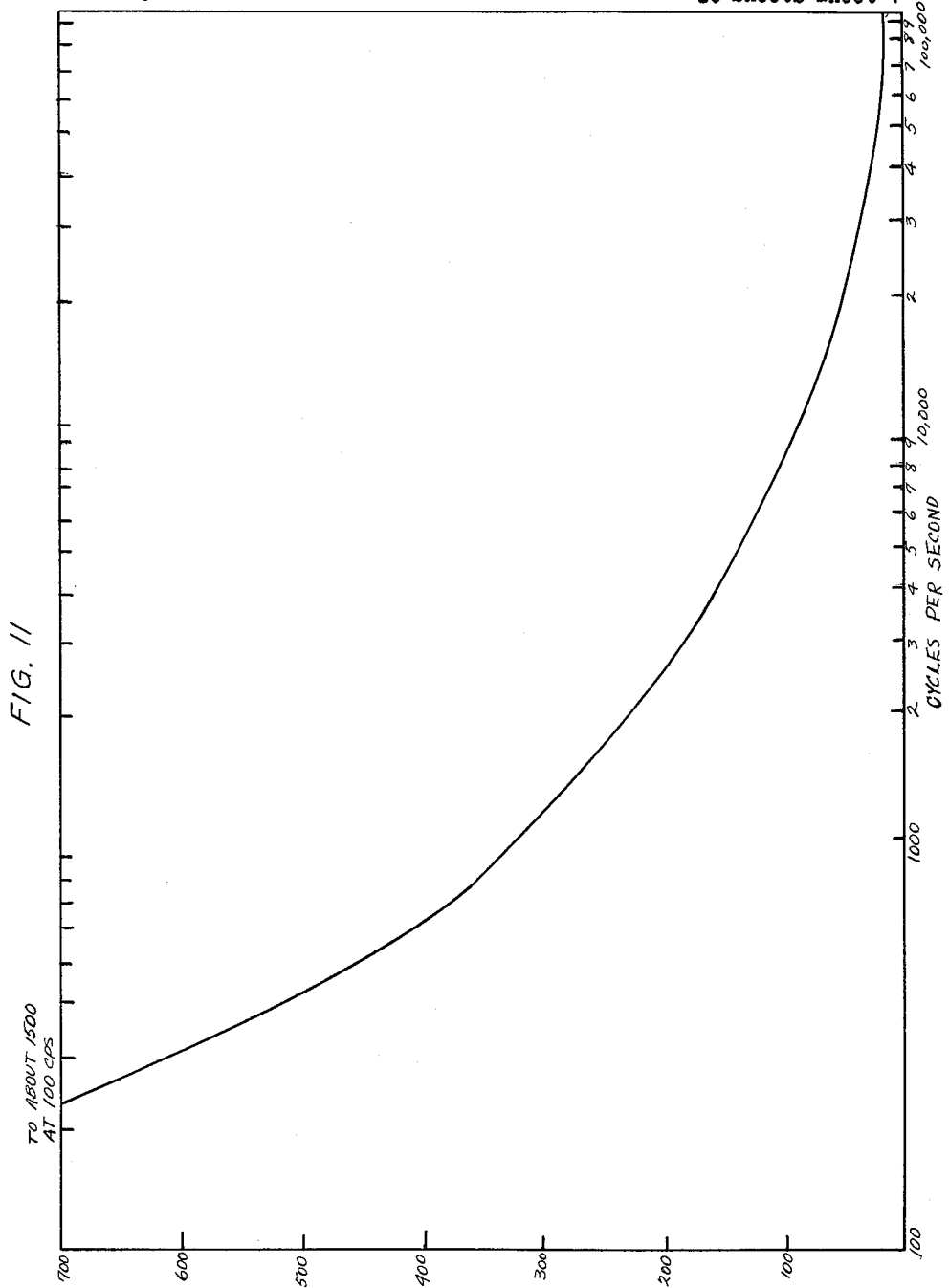

April 23, 1963  C. M. HENDERSON ETAL  3,087,002
THERMOELECTRICITY

Filed July 1, 1959  10 Sheets—Sheet 9

INVENTORS
Courtland M. Henderson
and
BY Darrel M. Harris
Herman O. Bauermeister
ATTORNEY April 23, 1963  C. M. HENDERSON ETAL  3,087,002
THERMOELECTRICITY
Filed July 1, 1959  10 Sheets-Sheet 10

INVENTORS
Courtland M. Henderson
and
Darrel M. Harris
BY
Herman O. Bauermeister
Attorney United States Patent Office 3,087,002
Patented Apr. 23, 1963

3,087,002
THERMOELECTRICITY
Courtland M. Henderson, Xenia, and Darrel M. Harris, Dayton, Ohio, assignors to Monsanto Chemical Company, St. Louis, Mo., a corporation of Delaware
Filed July 1, 1959, Ser. No. 824,240
2 Claims. (Cl. 136—4)

The present invention relates to thermoelectric compositions which are of utility for the direct conversion of heat to electricity. The invention also relates to methods of manufacturing the said compositions. The invention includes processes for generating electricity, as well as heating and cooling by the use of the said materials. The present invention also relates to the use of modified boron materials in dielectric (such as a capacitor), thermistor, transistor rectifier and other semiconductor applications and devices which are of utility in the field of electronics.

The thermoelectric materials contemplated in the present invention are composed of boron having intimately dispersed therein carbon and certain other elements. These elements are present at lower levels of concentration than correspond to the formation of chemical compounds, such as boron carbide, $B_4C$. These elements may therefore exist in proportions corresponding to the occupancy of certain spaces in the lattice of the boron metal as a matrix or as various types of solid solutions. The production of the present combinations of boron together with additive proportions of carbon or other elements is accomplished by various means discussed herein, such as hot-pressing a mixture of elemental boron together with the desired proportion of the desired element, or the use of precursor materials which upon processing decompose to yield boron with the desired element being present to combine with the boron in the specific proportions herein set forth. Thus, an alkyl boron compound such as triethylboron, has been found to be decomposed either alone, or in conjunction with diborane or boron trihalide at temperatures ranging from 1,000° C. to 3,000° C. to bring about the decomposition of boron with carbon in any desired proportion. Similarly the use of mixed halides of boron with decomposable hydrides or halides of doping elements (e.g., aluminum, titanium, iron, silicon, etc.) is employed to produce boron-based thermoelectric materials of unique compositions for various power generation, heating, cooling and semiconductor applications.

It is also an advantage of the present invention that electrical and thermal leads capable of operating for long periods of time at temperatures above 1,000° C. in contact with boron have been made possible. The problem of maintaining ohmic type contacts with boron has been a major obstacle to past workers who tried to determine the thermoelectric properties of boron above 600° C. In this invention it has been found that carbon and various metal leads can be attached, by the hot-pressing process discussed with other methods herein, to pure and doped boron pressed shapes to yield units capable of operating at very high temperatures, such as over 1,000° C. in air and other media. In air, the compositions of the invention have been found to be modified at high temperatures in that a protective film forms on the doped boron surface which protects it from further oxidation. A thin coating of non-conducting ceramic material such as Sauereisen, porcelain, etc., can also be used to protect the electrical leads. It has been found that compounds and elements of the group consisting of nickel, copper, gold, silver, vanadium, niobium, tantalum, carbon, silicon carbide, and beryllium oxide are particularly well suited to forming high-temperature (600–1,000° C.), low electrical resistance leads with boron-based materials. For temperatures above 1,000° C., the specific materials, vanadium, niobium, tantalum, carbon, silicon carbide, and beryllium oxide are especially useful.

It is an advantage of the present invention that boron-based materials, such as boron-carbon, boron-beryllium, boron-phosphorus, and boron-silicon are useful as thermoelectric materials, e.g., for obtaining electricity from heat sources above 1,000° C., well above the top operating temperature for conventional materials such as indium arsenic phosphide and lead or bismuth selenide and tellurides.

Figure 8:
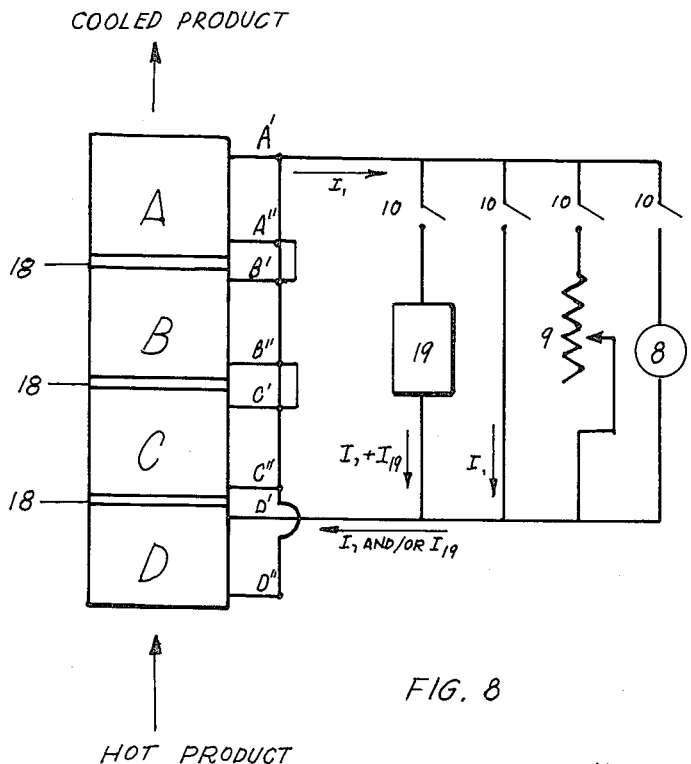
Figure 10:
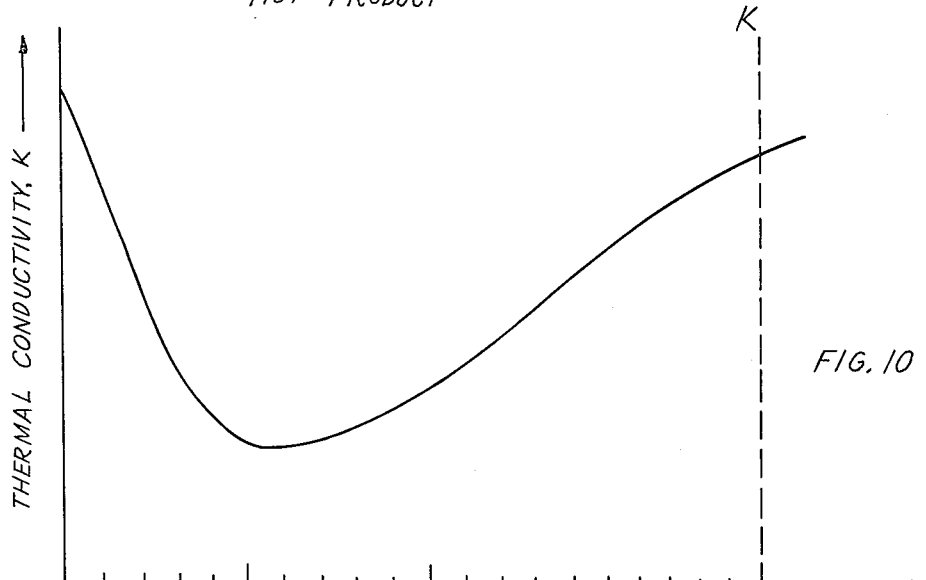
Figure 9:
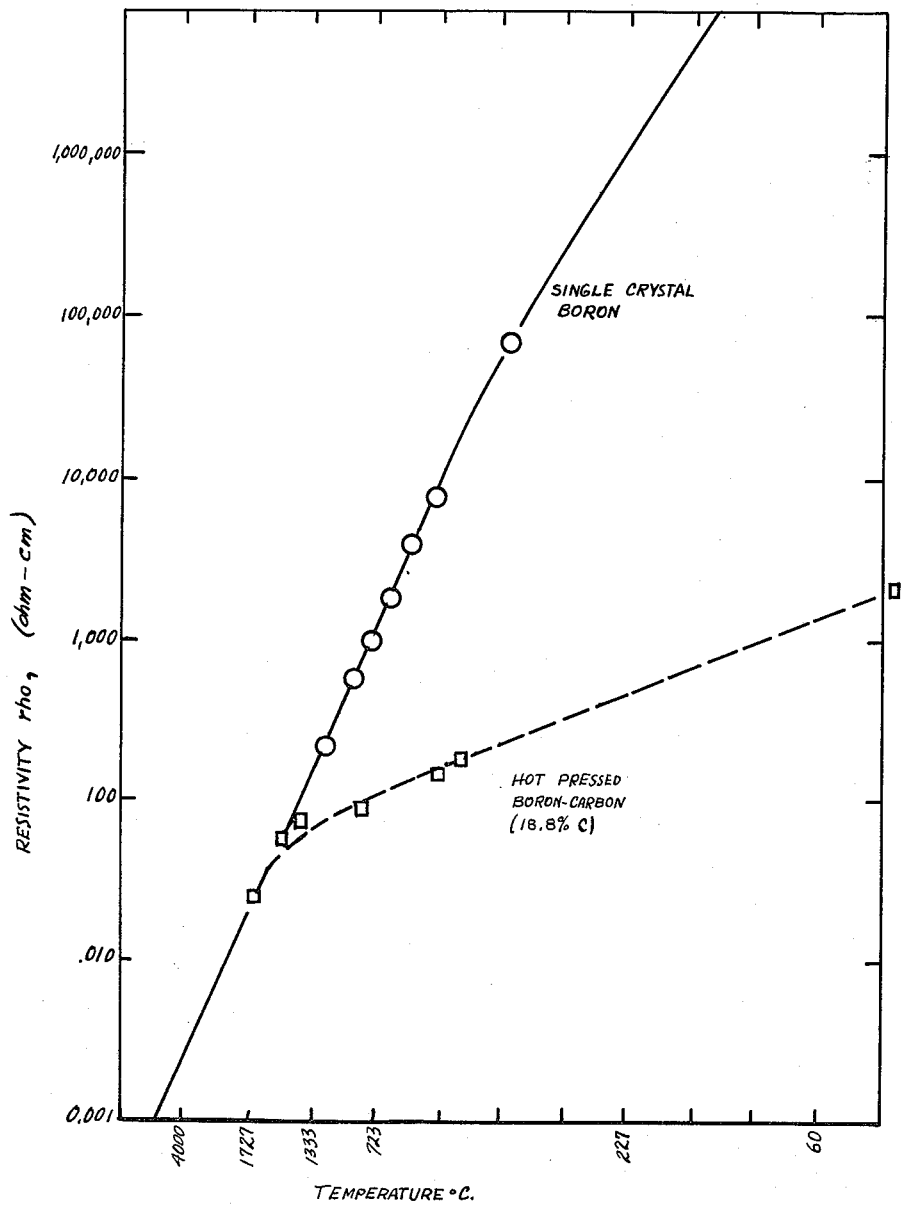
Figure 12:
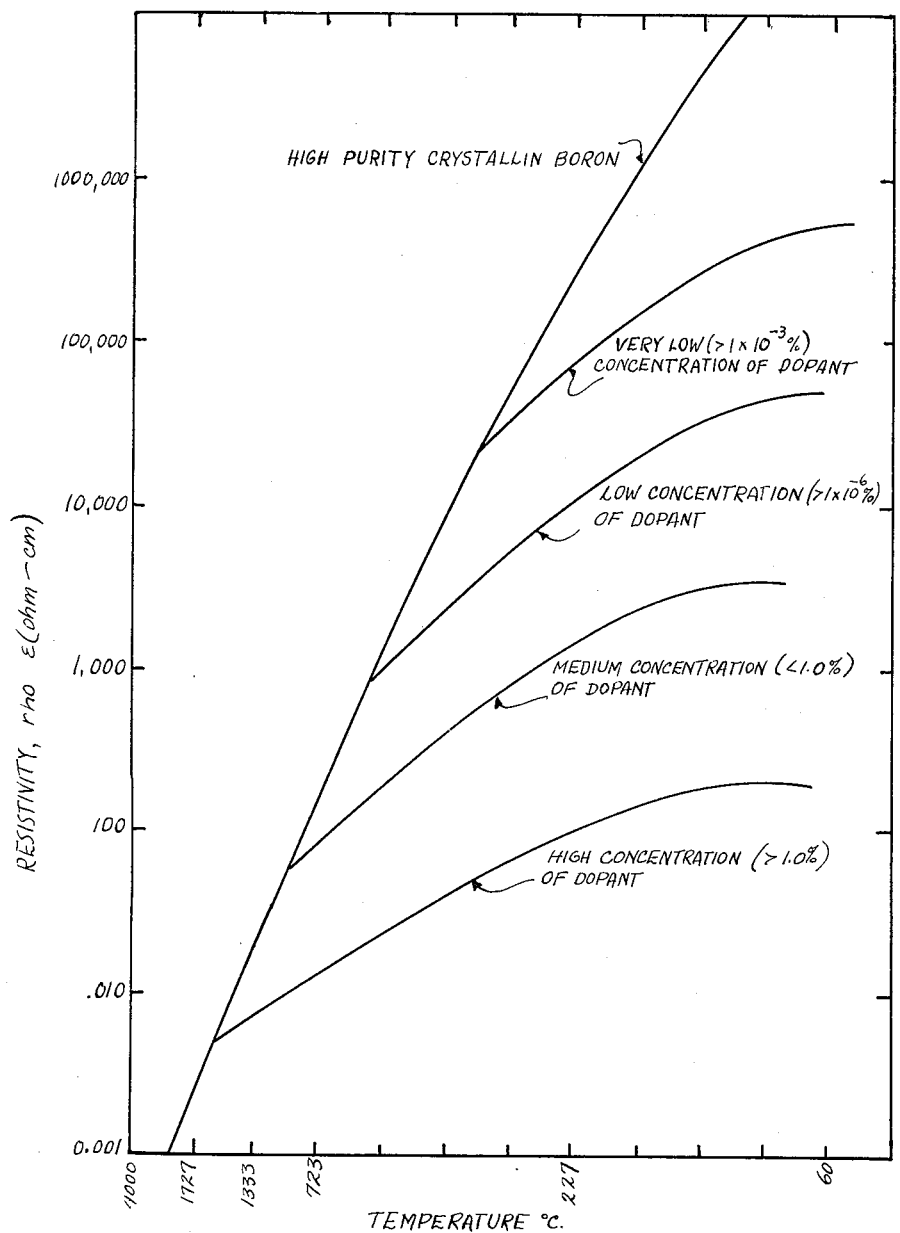
Figure 13:
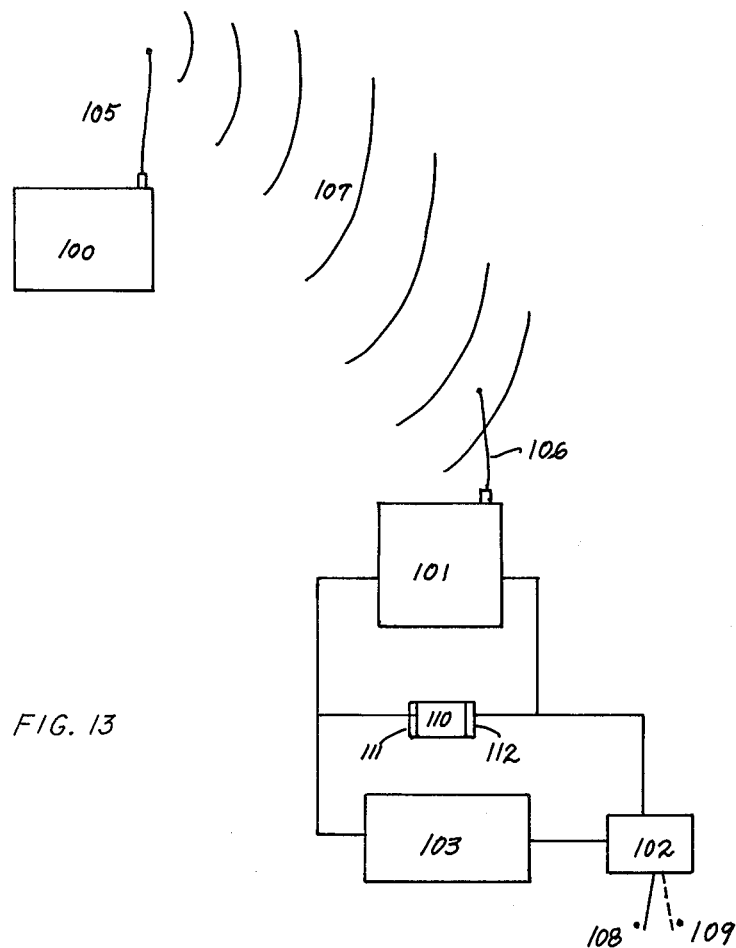
Figure 14:
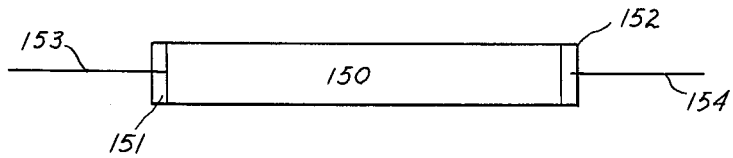
Figure 15:
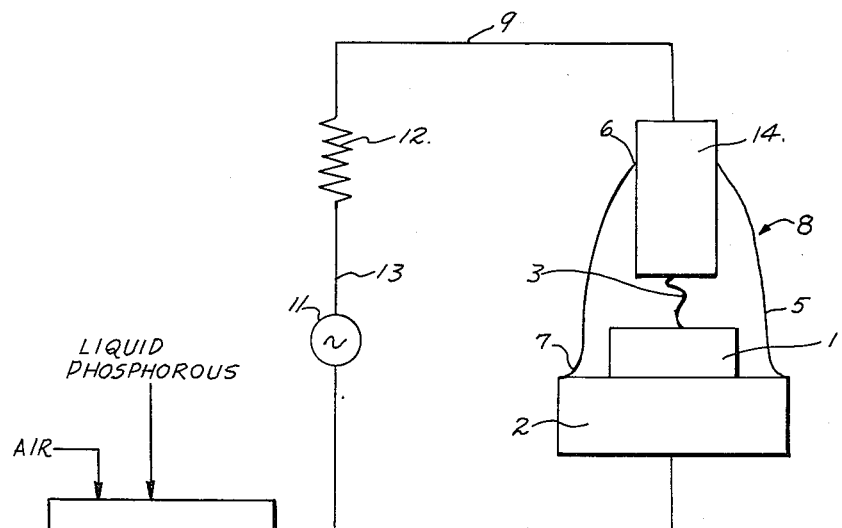

The drawings of this patent application show various specific embodiments and examples of the invention, and data illustrative of the present compositions. FIGURE 1 shows the thermoelectric characteristics of the carbon modified boron composition. FIGURES 2, 3, 4, 5, 6 and 7 illustrate various thermoelectric generating devices while FIGURE 8 shows an electrical circuit used with a multiplicity of units. FIGURE 9 shows the difference between the resistivity of high purity single crystal boron and hot-pressed boron-carbon material. FIGURE 10 shows the effect of carbon content on the thermal conductivity of boron-carbon thermoelectric material while FIGURE 11 shows how the dielectric constant varies with the frequency of an applied A.C. voltage. FIGURE 12 shows the effect of various dopant levels in boron as measured by the resistivity of resultant materials. FIGURE 13 shows the use of boron-base materials as a capacitor device for remote control purposes. FIGURE 14 illustrates the use of boron-base materials is thermistors. FIGURE 15 shows the use of boron-base materials for rectification purposes. Transistor applications are depicted for boron-base materials in FIGURE 16. The use of boron-base materials to recover heat in the form of electrical power and for cooling purposes in the processing of phosphorus are shown in FIGURE 17.

In the embodiment of the invention in which the boron based materials are used as a thermoelectric material, the present combinations of boron with carbon, silicon, aluminum, beryllium, magnesium, germanium, tin, phosphorus, titanium, zirconium, hafnium, cobalt, manganese and the rare earths of type 4f, particularly carbon are advantageously employed. These combinations are characterized by an unusually high stability of the Seebeck coefficient at elevated temperatures as shown in FIGURE 1 where the thermoelectric effect (Seebeck coefficient, S) is plotted vs. temperature for boron-carbon and compared with lead selenide and indium arsenic phosphide, as representative of the best prior art materials. In this relationship, it has been found that the boron-based material is useful as a thermoelectric power generating substance at temperatures far above those at which conventional metallic thermoelectric generating compositions may be employed. For example, indium phosphide has been investigated as a high-temperature, power-generation material but has been found to be ineffective at temperatures greater than 800° C. In contrast thereto, the present materials function as effective thermoelectric generator components at temperatures as low as 400° C. and are of particular utility at temperatures above 1,000° C. The present materials may therefore be used in power generation devices located in missiles and rockets, in atomic energy reactor linings, in exhaust stacks of chemical reactors, in petroleum processing units, etc. Thus, in employing a boron-based thermoelectric combination of the present invention in the wall of an atomic energy reactor or in various types of chemical reactors it is found that the removal of heat by this material serves to generate electricity which is usable for prime power generation and also for the purpose of cooling the walls of such equipment. It is well known that there are numerous problems in the chemical, nuclear and missile fields where it is advantageous to cool the walls and exhaust stacks of chemical and nuclear reactors desirably by some means other than conventional liquid or gaseous systems. It is possible by the present invention using boron compositions to simultaneously accomplish power generation and safe cooling of linings of chemical reactors and exhaust gas stacks, rocket chambers and exhaust nozzles.

The present materials therefore constitute a solid state electronic device for lowering the temperatures of reactor linings thus reducing the use of liquids and gases which can be dangeously volatile in such applications. The present solid state cooling devices of this invention also permit the location of specially shaped coolant members, particularly in critical, hard-to-cool sites such as in chemical reactors or high temperature electronic devices. A further advantage in the use of such solid state cooling devices is that they offer self-regulating self-powered smooth-temperature control which minimizes thermal stresses and maintenance of wall linings as well as a minimum of instrumentation for control purposes. In addition, it is noteworthy that there are no moving parts and little maintenance requirements in the use of these materials.

Figure 2:
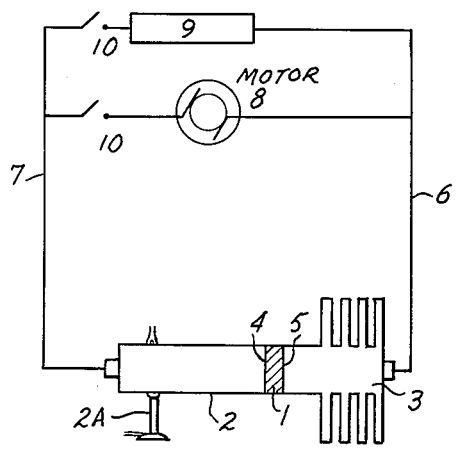
Figure 5:
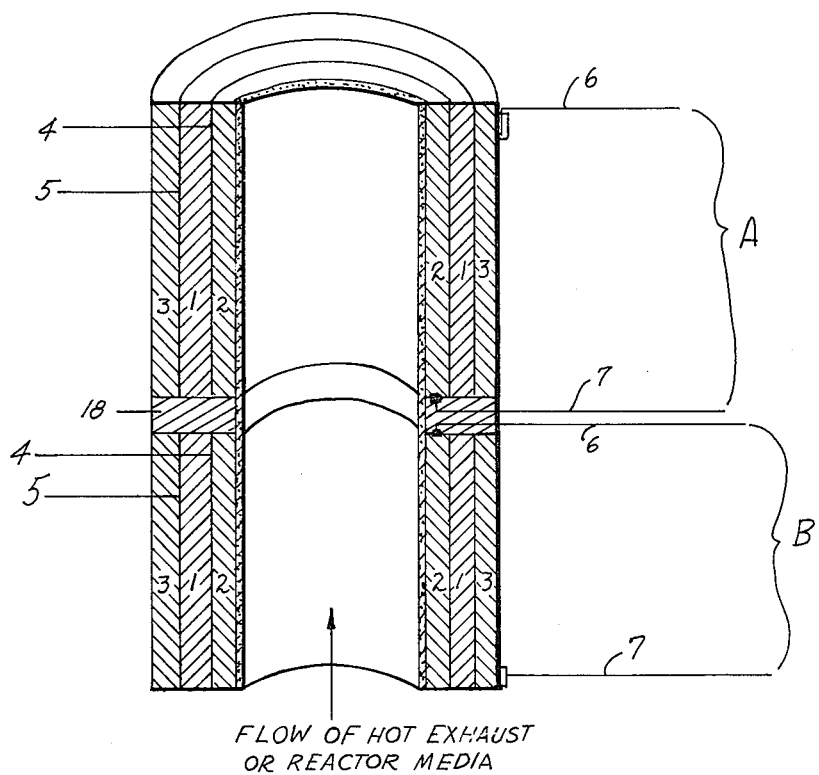
Figure 7:
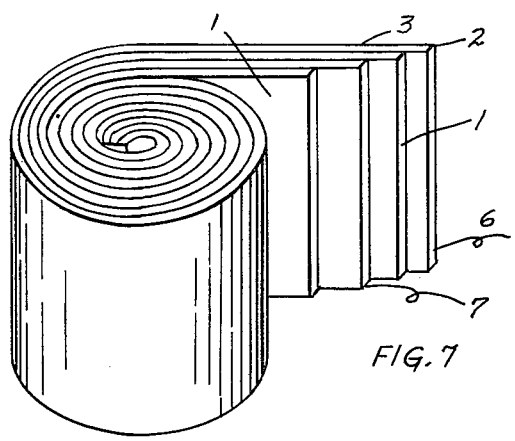
Figure 6:
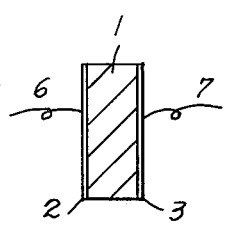

The individual thermoelectric generating, and also solid-state cooling elements employed in the present invention are founded upon thermoelectric units of the aforesaid boron-based material in which a doping element such as carbon is present in the boron lattice. With carbon, the range is from $1 \times 10^{-13}$ to 18% of the additive (atom percent) with the boron to form a unit. Such units are comprised of the boron-based material formed to highly conducting electrical leads by mechanical (compression) or welding (e.g., hot-pressing) methods. An example of such an electrical lead material is graphite, a form of carbon. This thermoelectric unit may be utilized per se, for example as concentric outer and inner cylinders of carbon in contact with an intermediate concentric of the boron-based material as shown in FIGURE 5. Another modification is to join plate-like boron-based elements to carbon or other conducting contacts in a sandwich-like configuration as shown in FIGURES 2 and 3. Multiple junctions may be made by conventional means using concentric and/or sandwich type units joined in series electrical connections or parallel electrical connections. Various shaped objects, for example liners for high temperature exhaust stacks of atomic reactors may similarly be provided in this manner. In this relationship the thermal and chemical stability of the boron-based combination is of particular utility. A chemical vessel may also, for example, be provided with sandwich or concentric type thermoelectric units made of boron-based thermoelectric generator materials.

EXAMPLE 1

As shown in FIGURE 5, the boron-based material 1 is joined to conducting material 2 and 3 which consist for example of carbon, nickel, or beryllium oxide. The inner conducting material 2 is joined to the inner lining 17 (or a refractory type or a metallic conducting type), or element 2 may itself serve as the inner lining. For example, carbon, nickel and beryllium oxides make excellent corrosion resistant linings for chemical reactors. Furthermore, these materials have desirable thermal and electrical conductivities useful in this relationship.

In FIGURE 5, elements 4 and 5 represent the junctions of the conducting leads 2 and 3 respectively with the boron-based element 1. Items 6 and 7 are the electrical leads connecting elements 2 and 3 respectively, to external circuits A and B.

It is often desirable to employ several individual units in series or parallel. In such instances, an electrical and thermal insulator 18 is used between the individual sections.

Thermoelectric units of boron-based materials can be used to form the wall of reactors or units of these materials, can be embedded a suitable distance below the surface of the wall. The boron-based material may be placed in contact with the innermost wall of the vessel by mechanical means or may be deposited in place, for example, by a vapor phase deposition. Thus, there is obtained a combination generator-cooling unit as a part of a chemical reactor vessel. When the unit of FIGURE 5 using the aforesaid materials is subjected to heat at the inner junction 4 of the boron-based material 1, and its outer junction 5 is cooled, electrical energy is generated by the unit which can be utilized as an electrical power source section A. This thermoelectric power generation absorbs heat through the hot inner surface 17 of the reactor wall, thus cooling it. This power, so generated, in section A can be used to provide the energy for operating a separate thermoelectric cooling unit B, or the power and cooling units may be provided as a combined unit. Automatic temperature control results when the cooling section B is placed upstream (or near the hottest section of the reactor) of the power generator unit A. Various combination thermoelectric units, through proper electrical switching, may be used entirely for power generation or cooling or any power-cooling combinations.

Excess cooling capacity can utilize auxiliary power from an external source as shown for example in FIGURE 8 where power source 19 may be switched to oppose current $I_1$ or to flow with it forming a combined current $I_1 + I_{19}$, as desired. It is understood that by reversing current flow in a thermoelectric cooling unit through application of an external power source that heating of the reactor walls prior to start up or for preheating reactants may also be achieved.

FIGURES 2, 3, 4, 5, 6 and 7 of the present patent application illustrate more specific embodiments and examples of the invention.

EXAMPLE 2

FIGURE 2 shows a thermoelectric unit in which the boron-based material with $1 \times 10^{-13}$ to 18 atom percent of carbon and/or other elements dispersed within the lattice of the boron as the matrix, is joined to conducting electrical leads 2 and 3. Such leads, or junctions, may be conventional conductive metals and compounds such as nickel or beryllium oxide. The junction is made by fusing the metal or compound into the boron-based material, or by spraying or plating (under vacuum or atmospheric conditions) on the faces 4 and 5 of the thermoelectric material 1, followed by fusing or pressure contacting with materials of 2 and 3 with faces 4 and 5 respectively. External circuit contacts are then made by conventional means such as soldering, welding or pressing of external circuit conductors to leads 6 and 7. In order to obtain an electrical current from the thermoelectric unit 1 an end 2 of this boron-based material is heated by heat source 2a, while the other end 3 is cooled. This produces a temperature differential across faces 4 and 5 which results in conductor 2 becoming positively or negatively charged according to the doping material used in the boron. The collection of positive and negative charges at faces 4 and 5 generates an electrical potential which when connected through leads 6 and 7 to external loads 8 and 9 through switches 10 can perform useful work. With carbon doping, for example, the hot end 2 is negatively charged since the boron-carbon material acts as a p-type generator material. When elemental beryllium doping is used, the hot end is usually positively charged, since the boron-beryllium material acts as a n-type generator material. The availability of n and p-type boron-based materials thus permits wide flexibility in the design and use conditions for thermoelectric generators made of these materials.

In addition to the above direct use of the boron-based thermoelectric material, another field of application is in combinations of this unique high-temperature product with other lower-temperature thermoelectric materials.

EXAMPLE 3

FIGURE 3 shows a thermoelectric generator in which high-temperature, boron based material is connected thermally and electrically in series with lower-temperature thermoelectric materials 11 (for example, indium arsenic phosphide), 12 (lead telluride) and 13 (bismuth telluride). By controlling the thickness of such typical materials 11, 12 and 13 with the boron composition, the thermal gradient across each material can be controlled and optimized. In this process, the peak or optimum efficiency for each material can be utilized. In FIGURE 3, showing a cross section of the thermoelectric device, heat from combustion $2a$, chemical waste heat, nuclear or other (e.g. solar) sources is directed to heat junction 2. Through the use of highly refractory metals or compounds (e.g. nickel or beryllium oxide) for element 2, heat sources well in excess of 1,000° C. can be used to heat the junction 4. Due to the low thermal conductivity of the boron-based material, the temperature at the junction 16 between material 1 and 11 can be maintained at a desirable lower (e.g., 500–600° C., as shown in FIGURE 1) temperature where material 11 (e.g. indium arsenic phosphide) most effectively operates. Similarly, by controlling the thickness of the layer of material 11 the temperature at the barrier 16 between materials 11 and 12 can be dropped to a still lower temperature (e.g. about 350° C.) where lead telluride or a similar material operates at peak efficiency. Finally, lead 3, consisting of a central hollow cylinder of high thermal and electrical conductivity, is partially filled with a condensable liquid (e.g. water, mercury, etc.). This condensable liquid maintains a nearly constant temperature for junction $5b$ through evaporation of vapor from the liquid 14. The vapor condenses on cooled (by radiation-conduction and/or convection) top portions of lead 3, and at surface 15 and on the side walls, thereby releasing heat to the finned or otherwise cooled portion 3 of the generator unit. Diffusion barriers 16, such as nickel, copper, boron nitride or other materials prevent migration of the boron or its doping elements from one layer to another.

EXAMPLE 4

Compositions of boron with various elements or combinations thereof that have been found useful for high temperature thermoelectric power generation and cooling purposes are presented below. These same compositions have also been found to be useful for other semiconductor applications and devices, such as capacitors as dielectrics, thermistors, transistors and rectifiers. In this table the small "$x$" represents atom percent for concentrations of dopant elements for the lower limit, upper limit and preferred concentration range. For the column headed "example," the small "$x$" represents atom fraction. For example, in the first horizontal line of table I, the material $BLi_x$ has the limiting formula of $BLi_{0.18}$.

Table I

LIST OF ELEMENTS BY GROUPS WHICH MAY BE ADDED TO BORON TO YIELD BORON-BASED MATERIALS OF USEFUL ELECTRIC PROPERTIES

| Period | Group | Lower Limit | Upper Limit | Preferred concentration Range | Examples |
|---|---|---|---|---|---|
| I | A | $1\times10^{-13}$ | 18 | $1\times10^{-6}$ to 15 | $BLi_x$, |
|   | B | $1\times10^{-13}$ | 20 | $1\times10^{-6}$ to 18 | $BAg_x$, $BAu_x$. |
| II | A | $1\times10^{-13}$ | 25 | $1\times10^{-6}$ to 20 | $BZn_x$. |
|    | B | $1\times10^{-13}$ | 25 | $1\times10^{-6}$ to 20 | $BCa_x$, $BSr_x$. |
| III | A | $1\times10^{-13}$ | 25 | $1\times10^{-6}$ to 20 | $BAl_x$, $BGa_x$, $BIn_x$. |
|     | B* | $1\times10^{-13}$ | 25 | $1\times10^{-6}$ to 20 | $BRE^*$, $BY_x$, $BAc_x$. |
| IV | A | $1\times10^{-13}$ | 19 | $1\times10^{-6}$ to 18 | $BC_y$, $BSi_x$, $BGe_x$, $BSn_x$, $BPd_x$. |
|    | B | $1\times10^{-13}$ | 20 | $1\times10^{-6}$ to 18 | $BTi_x$, $BZn_x$, $BHi_x$. |
| V | A | $1\times10^{-13}$ | 20 | $1\times10^{-6}$ to 18 | $BP_x$, $BSb_x$, $BHs_x$, $BBi$. |
|   | B | $1\times10^{-13}$ | 25 | $1\times10^{-6}$ to 20 | $BV_x$, $BNb_x$, $BTe_x$. |
| VI | A | $1\times10^{-13}$ | 20 | $1\times10^{-6}$ to 18 | $BS_x$, $BSe_x$, $BTe_x$, $BPo_x$. |
|    | B | $1\times10^{-13}$ | 25 | $1\times10^{-6}$ to 20 | $BCr_x$, $BMo_x$, $BW_x$. |
| VII | B | $1\times10^{-13}$ | 25 | $1\times10^{-6}$ to 20 | $BMn_x$, $BRe_x$. |
| VIII |  | $1\times10^{-13}$ | 25 | $1\times10^{-6}$ to 20 | $BCo_x$, $BFe_x$, $BNi_x$, $BRu_x$, $BIr_x$, $BP_x$. |

*NOTE.—RE includes lanthanide and actinide series.

In this group of additions or dopants which are combined with boron, the preferred members as discussed above are:

Carbon, silicon, aluminum, beryllium, magnesium, germanium, tin, phosphorus, titanium, zirconium, hafnium, cobalt, manganese and the rare earths of type $4f$.

However, the invention also contemplates certain other elements as shown above, with specific regard to proportions, both broadly and narrowly. Thus a grouping of the additives by periodic groups is that the preferred ranges of additives are present at from $1\times10^{-6}$ to 15 atom percent for group IA;

$1\times10^{-6}$ to 18 atom percent for groups IB, IVA, IVB, VA, VIA;

$1\times10^{-6}$ to 20 atom percent for groups IIA, IIB, IIIA, IIIB, VB, VIB, VIIB and VIII.

The broad range of proportions includes the range of additives from $1\times10^{-13}$ to 18 atom percent for group IA;

$1\times10^{-13}$ to 19 atom percent for group IVA;

$1\times10^{-13}$ to 20 atom percent for groups IB, IVB, VA and VIA;

$1\times10^{-13}$ to 25 atom percent for groups IIA, IIB, IIIA, IIIB, VB, VIB, VIIB and VIII.

Combinations of two or more elements with boron are useful as high temperature thermoelectric generator and cooling materials. Useful compositions of such combinations are governed by the above limitations for individual elements in that they must be present in concentrations greater than $1\times10^{-13}$ atom percent but not more than those directly proportional to the upper concentration limits of each element cited in Table I.

EXAMPLE 5

An example of the effect of composition on the thermal conductivity ($k$) of boron-based materials is depicted in FIGURE 10 where the variation of the thermal conductivity of carbon-doped boron is shown versus carbon doping content. Here a minimum value for the thermal conductivity occurs at 5–6 atom percent C in boron. In addition, it has been found that peak values of the Seebeck coefficient of carbon-doped boron also occurs between $1\times10^{-13}$ atom percent and 18 atom percent. Obtaining the three factors: Seebeck coefficient, thermal conductivity and resistivity permits obtaining thermoelectric generator units of unusually high overall efficiencies as shown in Table II.

*Table II*

THERMOELECTRIC GENERATOR CHARACTERISTICS OF CARBON-BORON MATERIAL (18 ATOM PERCENT C)

| (T₁) Ave. Temp., °C. | (k) Thermal conductivity, watts/cm., °C. | Electrical Resistivity, ohm-cm. | (S) Thermo-electric Power, volts/°C. | (Z) Merit Factor, 10⁻³/deg. | Overall Efficiency percent |
|---|---|---|---|---|---|
| 237 | 0.041 | 0.281 | 315 | 0.0086 | 0.22 |
| 622 | 0.034 | 0.820 | 335 | 0.042 | 0.52 |
| 859 | 0.039 | 0.055 | 350 | 0.057 | 1.05 |
| 950 | 0.039 | 0.017 | 355 | 0.19 | 3.77 |
| 1,039 | 0.041 | 0.009 | 351 | 0.33 | 6.45 |
| 1,800 | 0.01 | 0.009 | 345 | 1.32 | 28.8 |

Efficiencies approaching 55% are possible by combining various boron-based materials in series and parallel so as to cause each material to operate at its proper temperature for peak efficiency.

The combinations of the additive (e.g. doping) elements with the boron is preferably effected by hot-pressing a mixture of the boron with the additive such as lithium, silver, zinc, calcium, aluminum, a rare earth of the lanthanide and actinide series, carbon, titanium, phosphorus, vanadium, sulfur, chromium, manganese, iron and combinations thereof. This is done by heating the mixture of the above proportions, and preferably beginning with finely divided materials at a temperature not to exceed the melting point, but greater than 1,200° C. and preferably greater than 1,350° C. under pressure. The pressure may vary from atmospheric pressure to 200,000 p.s.i. A preferred range is from 50 to 50,000 p.s.i. It has been found that boron-carbon modified compositions with 18% graphite as a dopant are readily obtained by pressing a —100 mesh mixture at 2,100° C. and 2,000 p.s.i.

In addition to hot pressing a mixture, such as boron with 18 atom percent graphite, other fabricating methods which may be employed to produce the compositions of the present invention include arc fusion, induction fusion and resistance fusion.

EXAMPLE 6

The unique dielectric properties of boron-based materials are typified by the results plotted in FIGURE 11 where it is shown that the dielectric constant (K) varies with frequency. The dielectric constant of the boron-based materials has been found to vary with the strength of the electrical field applied across the material. Such characteristics are valuable for varying the impedance of electrical circuits from a remote position. The low specific density of boron-based materials combined with these remote control characteristics make such materials quite valuable for remote control systems in missiles, planes, or other devices where it is desirable to keep weight to a minimum.

EXAMPLE 7

A remote control device using the present boron-based material such as carbon modified boron (e.g. 0.10% C) or beryllium modified boron (containing 0.001 atom percent) is shown in FIGURE 13. One of the advantages of using the material of this invention is that no mechanical or moving parts are required to change the impedance of the electrical circuit in the control device. Here element 100 represents a radio signal sending device with aerial 105 transmitting radio energy 107 to receiving device 101 which consists of a radio receiving set 101 which consists of a receiving aerial 106 connected to a conventional receiving circuit in which the boron-based capacitor element 110 of the present invention is connected by leads 111 and 112 to cause the transmitted radio energy to build up or decrease the polarized voltage applied across the boron-based capacitor 110. The variation of the voltage applied across the capacitor 110 causes the dielectric constant of this material to change, thus varying the capacitance of the boron-based material 110, and thereby the impedance of the circuits in units 103 and 102. Unit 102 is typically a motor or electrically actuated lever switch and 103 is a radio circuit which it is desired to tune by remote control or which may be an electrical device for controlling unit 102. More specifically, motor circuit 102 is made to move switch or lever arm 104 between contacts 108 and 109. Tuneable circuit 103 is similarly controlled by boron-based capacitor unit 110, the resistance of which is varied in response to the signal transmitted from sender unit 100.

In additional to the specific embodiment discussed in this example, other capacitor uses of the boron based material include capacitor modified circuits generally such as chokes and condensers.

EXAMPLE 8

The large variations in resistivity of boron-based materials are quite valuable for electronic applications such as thermistors. FIGURE 13 shows how the resistivity can be tailored to almost any desired resistivity range through control of composition. It is particularly important for purposes of controlling both resistivity and thermal conductivity to form solid solutions of boron with other elements as shown in Table I. Thermistors of high sensitivity (great change in resistance to small variation in temperature) or any desired sensitivity can thus be produced by controlling the type and quantity of dopant used with boron.

FIGURE 14 shows a thermistor made from a boron-based material 150 of the present invention. A specific example of such a composition is boron containing .001 atom percent of manganese. This composition material 150 is intimately joined to conductive metal leads 151 and 152 of copper, or another good conductive material. The leads are connected to an external circuit. This device is used to damp or level off the peaks of surges of voltage through an electrical circuit. In addition this device is used to measure very accurately small changes in temperature of an environment in which the thermistor is placed.

The characteristic controllability of the semiconducting properties of boron-based alloys also fits them for use as rectifier materials.

EXAMPLE 9

In FIGURE 15 device 8 is a point contact rectifier device of the invention. Body 1 in the shape of a disc is suitably a boron-base material, such as boron containing about 0.01 atom percent beryllium. For optimum rectifying properties disc 1 should not be more than about 50 mils thick and preferably not more than about 10 mils thick. The bottom side of disc 1 has been coated with copper, nickel or other metals stipulated herein as electrical leads materials to make ohmic contact therewith and provide a conducting surface for soldering or welding to the disc electrode 2 which is suitably a copper electrode. The upper surface of body 1 is not coated and point contact electrode 3 is suitably a Phosphor bronze or a tungsten whisker, is pressed against the upper surface of disc 1 to make ohmic contact therewith. Suitably a pressure of about 50 grams of force is used pressing the point contact electrode 3 against the top of disc 1; however, this force might vary from about 10 to about 100 grams more or less, for optimum performance. Suitably the upper end of whisker 3 is soldered or welded to electrode 4 which is suitably a copper electrode. Surrounding and enclosing disc 1 and point contact electrode 3 is glass capsule 5. Glass to metal seals 6 and 7 seal capsule 5 to electrodes 4 and 2, respectively. Such an arrangement as this allows the maintenance of any type of desired atmosphere around disc 12, including high vacuum, if desired. It is very easy to make an opening in the glass capsule to provide the desired atmosphere inside and seal off the opening in the glass to maintain this desired atmosphere. Device 8 is then connected by electrical leads 9 and 10 to an alternating current source 11 to be rectified and an electrical load 12. Suitably, the direct current voltage resulting from the rectified current flowing in the system will appear across resistor 12. Line 13 connects alternating current source 11 and resistor or load 12 completing the electrical circuit. Suitably, alternating current source 11 can be a 110 volt, 60 cycle source or other alternating current source of higher or lower voltage.

EXAMPLE 10

Figure 16:
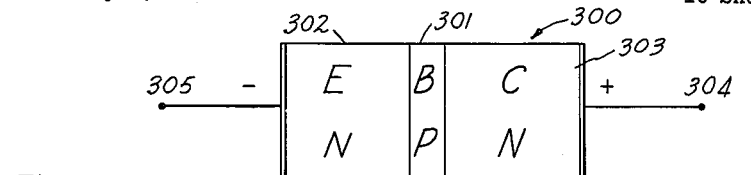
Figure 17:
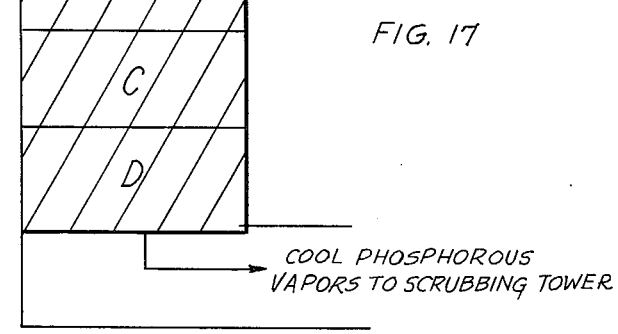

A type of junction transistor 300 consisting of n-type and p-type materials is shown in FIGURE 16. The transistor assembly shown is of the n-p-n-type, but p-n-p is also included in the invention. The section 301 between the two end blocks 302 and 303 is called the body and this forms a common connection between input and output circuits. The emitter is designated by the letter E, the body by B and the collector by C. Generally the transistor 300 has its emitter connected to an input terminal 305, and the body connected through a source of power such as a battery 307 to another input terminal 306. The collector 303 of the transistor is connected to an output terminal 309 while the body is connected through a second source of power such as battery 308 to the other output terminal 309. Normally, batteries 307 and 308 will be arranged so that the emitter has a negative polarity with respect to the body, and the collector is positive with respect thereto. However, under certain conditions, it is desirable to reverse the polarities of the batteries 307 and 308. Such a boron-based transistor is useful for amplification purposes or any use where conventional vacuum tubes such as triodes or similar devices are required. Typical compositions found useful for transistor devices shown in FIGURE 16 are: (1) for n-type material 0.0001 atom percent beryllium in boron, (2) for p-type material 0.00001 atom percent silicon in boron. A more complete range of compositions useful for transistor applications is shown in Table I. Boron-based materials as either p- or n-type semiconductor materials are optionally used in conjunction with known p- or n-type semiconductor materials such as silicon germanium and silicon carbide.

EXAMPLE 11

A specific example of the thermoelectric cooling of the present invention is a phosphorus furnace for the production of phosphoric anhydride, such as is shown in simplified form in FIGURE 17. Here 400 is a furnace body into which there is directed a stream of white liquid phosphorus 401 and air 402 or other oxygen source. The oxidation of the phosphorus evolves a tremendous amount of heat which must be dissipated.

Prior art methods for removing heat from phosphorus burners have been based upon cooling water sprays, but because of the furnace wall temperatures in excess of 800° C., such methods are costly.

It has now been found that a phosphorus burner having an exit gas stream 403 containing phosphoric anhydride is readily cooled by contacting the said hot gas stream against a surface containing a body of modified boron as described above, a preferred material being boron modified by carbon to the extent of from $1 \times 10^{-13}$ to 18 atom percent, or preferably $1 \times 10^{-6}$ to 15 atom percent. A specific material has 5 atom percent carbon. The body of each boron-based unit A, B, C and D is connected by electrical leads to an external electrical circuit, so that the thermoelectric cooling occurring in the burner body 400 gives an output of electricity. Multiple thermoelectric units are electrically joined for self cooling using the circuit shown in FIGURE 8.

What is claimed is:

1. A device for generating electricity when in contact with a region of high temperature in said device comprising at least three thermoelectric bodies in electrical series, the first said body being subjected to the highest temperature and comprising boron containing about 5 atom percent of carbon dispersed in the said boron, the first body being in contact with a second thermoelectric body of indium-arsenic-phosphide, the second body being in contact with a third thermoelectric body selected from the group consisting of bismuth telluride and lead telluride.

2. A device for generating electricity when in contact with a region of high temperature in said device comprising as the thermoelectric-generating component therein at least three thermoelectric elements in electrical series, one of which comprises boron containing from $1 \times 10^{-13}$ to 18 atom percent carbon and is subjected to the highest temperature, a second element being in contact with said first element is comprised of indium-arsenic-phosphide, and a third element being in contact with said second element is selected from the group consisting of bismuth telluride and lead telluride.

References Cited in the file of this patent

UNITED STATES PATENTS

| | | |
|---|---|---|
| 1,019,390 | Weintraub | Mar. 5, 1912 |
| 1,079,621 | Weintraub | Nov. 25, 1913 |
| 2,152,153 | Ridgway | Mar. 28, 1939 |
| 2,919,553 | Fritts | Jan. 5, 1960 |
| 2,946,835 | Westbrook et al. | July 26, 1960 |